Patented Mar. 13, 1934

1,950,430

UNITED STATES PATENT OFFICE 1,950,430

PROCESS OF IMPREGNATION AND PRODUCT OBTAINED THEREBY

William S. Calcott, Penns Grove, N. J., Albert S. Carter, Wilmington, Del., and Frederick B. Downing, Carneys Point, N. J., assignors to E. I. du Pont de Nemours & Company, Wilmington, Del., a corporation of Delaware No Drawing. Application October 7, 1931, Serial No. 567,464

11 Claims. (Cl. 91—70)

This invention relates to new materials for use in impregnation processes and their method of application. More particularly, it discloses the use of certain compositions comprising especially nonbenzenoid acetylene polymers and derivatives thereof for the purpose of impregnating porous substances.

Numerous references are to be found in the prior art concerning processes of impregnating wood, concrete, cloth, paper, stoneware and the like with linseed oil, mineral oil, natural and synthetic substances, coal tar distillates, etc., to prevent absorption of moisture or chemicals which result in their deterioration. All of these processes approach the desired end, but none suffices with regard to chemical stability and ease of impregnation. Many materials which would be more nearly satisfactory from the standpoint of stability are unsuccessful owing to the difficulty met in introducing them into the structure of the object to be impregnated.

We have now discovered that certain products derived from acetylene may be introduced into any porous structure in a liquid state and subsequently cured by simple means resulting in an impregnated mass which is unusually resistant to the effects of the usual corrosive agents and which is no longer porous, thus preventing further absorption or penetration by other agents.

U. S. Patent to Nieuwland Patent No. 1,811,959, filed December 29, 1930, and pending applications to Nieuwland, Serial No. 505,463, filed December 29, 1930, Nieuwland and Vogt, Serial No. 505,462, Calcott and Downing, Serial No. 303,494, filed September 6, 1928, and Carter and Downing, Serial No. 538,920, filed May 21, 1931 have described various phases of the preparation of monovinylacetylene, divinylacetylene, $C_8H_8$ and other nonbenzenoid polymers from acetylene. These products may be further polymerized in accordance with the teachings of the U. S. patents to Nieuwland Patent No. 1,812,541 and to Collins Patent No. 1,812,849, and according to pending applications to Calcott and Downing, Serial No. 288,528, filed June 26, 1928, Calcott and Downing, Serial No. 377,662, filed July 12, 1929, and Carter and Downing, Serial No. 503,606, filed December 19, 1930, to obtain more or less viscous liquid polymers. To illustrate these inventions. the following examples are given.

Example A

Nine hundred and forty-five parts by weight of ammonium chloride, 1000 parts by weight of water, 2850 parts by weight of cuprous chloride, and 100 parts by weight of copper powder, are mixed and this mixture thoroughly agitated while passing into it acetylene gas. When the reaction slows up, as shown by a decrease in the rate of absorption of acetylene, the operation is discontinued, and the highly unsaturated hydrocarbon product formed is obtained by distillation, which is stopped when the condensed hydrocarbon is mixed with much water. The water is separated and returned to the reaction mass which, after cooling, is ready for the absorption of more acetylene. It is preferable, although not essential, to keep the reaction temperature at approximately 25° C. by suitable cooling of the reaction mass. As already stated, the resultant material contains a number of polymers which may be roughly separated by distillation.

Example B

One thousand grams of pure divinylacetylene obtained from the product of Example A by distillation are boiled at atmospheric pressure and in the presence of air for four hours in a vessel provided with a condenser for the return of the condensed vapors to the reaction. The temperature of the boiling liquid is between 89° and 90° C. At the end of four hours the unchanged divinylacetylene is distilled off under reduced pressure. There remains, in 12 to 18% yield, a viscous non-volatile residue having the general properties of a bodied drying oil and consisting of the polymerized divinylacetylene.

Example C

Liquid monovinylacetylene to which hase been added 1% of benzoyl peroxide is sealed in a closed tube at about —10° C. under an atmosphere of nitrogen and heated at 100°–110° C. for 6 hours. A product containing 25–30% of non-volatile polymer is obtained. The benzoyl peroxide functions as a polymerization catalyst.

The preparation of modified acetylene polymers is disclosed in the pending applications of Calcott and Carter, Serial No. 367,831, filed June 1, 1929, which describes the treatment of acetylene polymers with sulfur chloride; Calcott and Carter, Serial No. 420,275, filed January 11, 1930, which describes the direct halogenation of acetylene polymers, and Calcott and Carter, Serial No. 434,158, which describes the treatment of acetylene polymers with sulfuryl chloride. The subject matter of each of these three applications relates to the halogenation of nonbenzenoid acetylene polymers, although the treatment with sulfur chloride has a sulfurizing, as well as a halogenating effect. The following examples illustrate the subject matter of these applications:

Example D

Two hundred parts of a liquid acetylene polymer of high molecular weight, obtained by heating an acetylene polymer comprising divinylacetylene to about 85° C. for three hours and distilling off the volatile constituents, is treated with 1 part sulfur chloride in 1 part of toluene with stirring. The mixture so formed, containing probably 0.8% of the liquid reaction product is a dark brown viscous liquid which upon drying in air forms a hard dry brittle solid film.

Example E

One hundred parts by weight of the unpolymerized acetylene polymer, thought to be divinylacetylene and obtained from the mixture prepared as described in Example A, are dissolved in an equal weight of cold carbon tetrachloride; the mixture is cooled to 20° C. and gaseous chlorine is passed through a porous porcelain gas distributor into it. Maintaining the temperature between 20° and 30° C., the addition of chlorine is continued until 270 parts have been absorbed. The yellow viscous solution may be used as such or it may be purified by well known methods. The major constituent of the product distills with decomposition with an apparent boiling point of 145–150° C. at a pressure equivalent to 12 mm. of mercury; it is thought most probably to have the formula $C_6H_6Cl_6$, probably 1,2,3,4,5,6-hexachlorohexene-3.

Example F

One hundred parts by weight of the acetylene polymer of Example A thought to be divinylacetylene is added to approximately 170 parts of sulfuryl chloride at room temperature. The reaction is hastened at the start by warming slightly, but as soon as it becomes apparent as evidenced by the evolution of $SO_2$, the mixture is cooled and held at 30°–35° C. until the reaction is completed. When no more $SO_2$ is liberated, the product is washed with water giving a crude oil which may be used as such or purified by steam distillation or vacuum distillation, giving a dark tarry residue of polymerized chlorine-containing acetylene polymers and a volatile oil. The oil is a heavy colorless liquid which decomposes and polymerizes at elevated temperature with a probable boiling point of 58° C. at 7 mm. of mercury pressure.

The process illustrated in Example D may be applied to the unpolymerized acetylene polymers of Example A, and the processes of Examples E and F are applicable to the treatment of partially polymerized acetylene polymers similar to those prepared by Example B. These modifications are suggested in the Calcott and Carter cases from which these examples have been taken.

For the purpose of this invention a raw impregnating material may be used which is (a) a synthetic drying oil similar to that prepared in Example B; (b) a solution of a polymerized acetylene polymer similar to that obtainable by Example B; (c) a simultaneous polymerization product prepared from the acetylene polymers described in Example A with other polymerizable materials according to the examples hereinafter described; (d) mixtures of the products described in Example B with suitable resinous products; or (e) polymerizable reaction products of the acetylene polymers such as the sulfur chloride treated products of Calcott and Carter, Serial No. 367,831 and exemplified in Example D, or the polymerizable halogenated products of Calcott and Carter, Serial Nos. 420,275 and 434,158 and illustrated in Examples E and F, respectively.

We have found that these materials may be introduced into porous substances and will then set up to insoluble products, decreasing the porosity of the impregnated material and rendering it very resistant to chemical agents, moisture, etc.

The following examples present illustrations of various adaptations of the invention.

Example I

A silica brick (8" x 3½" x 2") composed of partially fused ground silica is submerged in a 100% solution of the liquid polymerized acetylene polymers described in Example B (above) for ten minutes. At the end of this period, the brick is removed, drained and allowed to cure in the air for two weeks. The weight of the brick before and after treatment indicates that the polymer absorbed was equivalent to 12% of the original weight. Upon cutting and examination either by eye or by density determinations, it is found that the polymer is concentrated in the outer layers and that very little has penetrated to the center. Before treatment the brick was very porous, allowing water to pass thru it with very little resistance. After treatment, it was waterproof and absorbed practically no water upon immersion.

Example II

Example I was repeated, using a 50% solution of the non-volatile polymers from Example B dissolved in toluene. The amount of polymer absorbed was approximately the same and the properties of the brick after impregnation were similar with the exception of the fact that it absorbed slightly more water upon immersion, but upon examination after cutting it was found that the polymer was uniformly distributed throughout the brick.

Example III

Example II was repeated, but after the impregnated brick had been allowed to air dry for 36 hours, it was baked in an oven at 80° C. for 24 hours. The resulting object was essentially the same as obtained in Example II, except that during curing, all odor of unpolymerized acetylene polymer had been removed, showing the cure to be more complete.

Example IV

Example III was repeated, but using a 50% toluene solution of the polymer prepared according to Example C above. The impregnated object was essentially the same as that obtained in Example III but somewhat slower to cure.

Example V

Acetylene polymer obtained according to Example B was poured into alcohol with rapid agitation; the alcohol solution was poured off of the semisolid precipitate and the precipitate dissolved in an equal weight of toluene. This solution of semisolid acetylene polymers was used for the impregnation of porous tile according to Example III, giving a product which was well penetrated with resin and very rapid to cure.

Example VI

One hundred parts of a 50% solution of the polymer prepared in Example B in toluene was mixed with one part of sulfur chloride and treated as described in Example D, above. This solution was used for impregnating according to Example III, giving a product which cured more slowly and which was less hard and brittle than the impregnated product of Example III.

Example VII

A solution is prepared containing 10% ethyl abietate, 60% polymer prepared according to Example B and 30% toluene. Impregnation according to Example III with this solution gives a product somewhat similar to that of Example VI. Other toluene soluble resins may be used in place of ethyl abietate to modify the properties of the impregnated material. Thus in the impregnation of textiles, it may be desirable to have a softer product and this may be accomplished by the addition of such substances as rubber, polymerized butadiene, mastic, damar, Burgundy pitch, gum elastica, Mariola gum, ester gum, paracoumarone, coumar, romog, gilsonite and many other toluene soluble natural and synthetic resins.

Example VIII

Five per cent of the well known toluene soluble resin obtained from phthalic anhydride and glycerol was incorporated with the acetylene polymer from Example A prior to polymerization. The polymerization and removal of unpolymerized liquid was carried out as in Example B, leaving 15-20% of non-volatile material. This was dissolved in an equal weight of toluene and used for impregnation, giving as a product, a much tougher and more flexible resin. When impregnated in tile, this is not readily observed, but if cloth is impregnated in a manner similar to that described in Example II, the greater flexibility is at once apparent. This simultaneous polymerization of the acetylene polymer with the glycerol-phthalic products results in much greater compatibility than is obtained by simply mixing. In view of this unexpected compatibility, we speak of it as cross polymerization. Cross polymerization to effect greater flexibility may also be carried out with butadiene, China-wood oil, linseed oil, styrene, furylethylene, isoprene, phenol-formaldehyde compositions and other natural and synthetic products which are soluble in toluene or solvent naphtha during polymerization.

Example IX

Impregnation of cloth was carried out as described in Example II, using a solution to which 1% of eugenol had been added. The curing time was increased over 10%.

Example X

Example IX was repeated using a solution containing 1% of sodium perborate in place of the eugenol. Curing was accelerated to a point 15% faster than the sample containing eugenol.

Example XI

A block of kiln dried fir (1" x 1" x 6") was impregnated in the manner described in Example III but the wood was kept immersed in the polymer solution for 3 hours. The change in weight indicated a 10% impregnation.

Example XII

A block of fir similar to that referred to in Example XI was impregnated in the same manner except that the solution was warmed to 80° C. and then permitted to cool again to room temperature during the impregnation. Weight change indicated that over 30% impregnation had been accomplished.

Example XIII

A block of kiln dried fir was impregnated in a 50% xylene solution of the polymers prepared in Example B. The impregnation process was identical with that described in Example XI except that at intervals of 15 minutes, the impregnation vessel was evacuated to the vapor pressure of the solution and then closed for 15 minutes heating under diminished pressure, at the end of which time the evacuation was repeated, etc. Impregnation was over 50%.

Example XIV

Example XII was repeated, but instead of evacuating, the system was subjected to a nitrogen pressure of 5 atmospheres during the heating and cooling. The impregnation was approximately the same as obtained in Example XIII.

Example XV

Graphite electrodes (30" x 2" x 2") were impregnated in the manner described in Example XIII. Upon cooling and scraping they were found to contain 15% of resin. Graphite electrodes impregnated with nonbenzenoid acetylene polymers, whether in solution or not, possess a high degree of inertness or indifference to electrical and chemical erosive action, have comparatively little, if any, porosity, and are extremely durable. These electrodes outlasted untreated electrodes when used as anodes in the electrolytic generation of chlorine from brine.

Example XVI

Impregnation was carried out on kiln dried fir in a manner similar to Examples XIII and XIV, the operation being carried out in vacuo for 15 minutes, then under 5 atmospheres pressure for 15 minutes, then in vacuo again and so on during this period of heating. The weight of the cured product indicated that over 100% impregnation had occurred (resin more than that equivalent to the original weight of the wood had been absorbed). Wood so treated is very resistant to corrosive chemical action such as that of hydrochloric acid.

Example XVII

A porous concrete tank was impregnated simply by swabbing a 50% solution of liquid polymerized acetylene polymers on the interior surface. This was repeated within three hours and again within six hours. After curing by standing in air for 48 hours, the tank was waterproof and resistant to the corrosive action of dilute acids.

Example XVIII

In the manner described in Example XVII, basement walls have been waterproofed.

Example XIX

In the manner described in Example XVII, concrete floors have been made resistant to acid corrosion.

The process of impregnation described herein is flexible and may be varied within the limits defined below to accomplish any desired degree of saturation with the resinous material.

During the impregnation, the substance to be introduced (the acetylene polymer or a composition containing same) may be used as such, if it be liquid, or in solution. It has been found that the use of a solvent increases the ease and depth of penetration, but does not ordinarily give a higher degree of saturation than does the undiluted material. (By degree of saturation we mean the weight of resin deposited per unit weight of raw substance; thus a piece of holly wood weighing originally 5 gms. is impregnated and found to weigh 11 gms. after drying; it would be called (11—5)/5 or 120% impregnated). In this way, we may treat two like pieces of wood with 100% acetylene polymer and a 50% solution of the acetylene polymer and find the absorption to be about the same, but upon determination of the densities of sections cut from the center and from the outside of the wood test-pieces, it might be found that impregnation had been shallow in the case of the 100% solution but had occurred to a high saturation, whereas the 50% solution would be less saturated but uniform throughout the thickness of the test piece. Solvents suitable for the purpose of this invention comprise volatile aromatic hydrocarbons such as benzene, toluene, xylene, solvent naphtha, high-flash naphtha and the like. It has also been found that the object to be impregnated is frequently wet more rapidly by the impregnating solution if it is first wet by one of the above solvents before impregnation.

Reduced and increased pressure are both advantageous to this process. When impregnation is accomplished at diminished pressure, the air more readily escapes from the porous structure and is displaced by the impregnating solution; if increased pressure is used, the penetration is expedited by forcing in the resin material. There are no fixed limits to the pressure useful in this process, but we have found it generally uneconomical to exceed a pressure of 250# per sq. inch; any vacuum pressure down to the vapor pressure of the solution may be used. Impregnation may be carried out at atmospheric pressure, but depending upon the nature of the material treated and the degree of saturation desired, pressures above or below atmospheric may be used. A preferred method of treatment in cases where high impregnation is desired is to alternately treat below and above atmospheric pressure, thus rapidly displacing moisture and air during the diminished pressure periods and subsequently forcing the impregnating material into the voids during the pressure portions of the cycle.

An increase in temperature aids the process by expanding the gases adsorbed in the porous structure of the material to be impregnated and thus facilitating displacement by the solution. Any temperature below the thermal decomposition temperature of the impregnating solution may be used, but we prefer the use of temperatures between 10° C. and 125° C. in the case of 100% solutions of the acetylene polymers and between 10° C. and 200° C. in the presence of solvents.

It is further to be noted that the use of elevated temperatures and pressures during the impregnation accelerates polymerization of the acetylene polymers, hence the curing may take place to a certain extent during the impregnation. It must also be remembered that this curing phase, if allowed to progress too far, may result in the entire impregnating solution becoming solid or semisolid and therefore difficult to handle, so that the conditions maintained during impregnation must be regulated to prevent the occurrence of this disadvantage.

Curing the impregnated substance is merely the process of completing the polymerization of the acetylene polymer. This may be accomplished by aging at room temperature for several days or by baking at elevated temperatures for several hours. When solvents have been used during impregnation, several hours of room temperature drying should be allowed before baking is attempted, thus permitting the solvent to evaporate off. If baking is begun while the solvents are present, much of the polymer will be mechanically forced to the surface as the volatile constituents escape. As in the impregnation, any temperature may be used for the cure below the thermal decomposition temperature of the acetylene polymer, but we prefer the use of temperatures below 125° C. Free access of air or oxygen catalyzes the curing, oxidation simultaneously taking place, and if desired, catalysts may be added to the solution before impregnation to speed up the curing. As catalysts for this polymerization, the following materials and groups of substances have been found effective: certain acids such as fluoboric acid and formic acid, oxygen, peroxides such as sodium peroxide, barium peroxide, manganese dioxide, hydrogen peroxide and benzoyl peroxide, percarbonates, perborates, persulfates and other per-salts, and anhydrides such as acetic anhydride, maleic anhydride and phthalic anhydride. The rate of polymerization or curing in each of these cases is proportional to the quantity of catalyst used, each catalyst being different in regard to the quantity necessary to produce a definite rate of polymerization. Any quantity may be used as desired, but we prefer to use less than 2%.

On the other hand, if it is desired to minimize the polymerization during impregnation and slow down the curing rate, this may be accomplished by working in an inert atmosphere such as nitrogen, carbon dioxide, benzene vapor or any other atmosphere which is non-oxidizing and inert to these nonbenzenoid acetylene polymers. For this purpose too, antioxidants may be used as negative polymerization catalysts, such as dibutylamine, methyl aniline, hydroquinone, catechol, eugenol, and any of the antioxidants mentioned in the above cited patent applications on the polymerization of polymerizable nonbenzenoid polymers of acetylene.

We have discovered therefore a process for impregnating porous substances, especially tile, cement, concrete, wood, textiles, graphite, paper and fabricated pieces constructed from these materials, with polymers of vinylacetylene, divinylacetylene, other polymerizable straight chain polmers of acetylene, and polymerizable reaction products thereof such as the above mentioned sulfur chloride product. Said process involves an impregnation step, the following factors of which are disclosed:

(a) Direct use of polymerizable impregnating agents
(b) Use of solvents
(c) Use of mixture with other resinous materials
(d) Use of cross polymers (see definition)
(e) Use of reaction products
(f) Temperature controlled
(g) Pressure and vacuum controlled
(h) Alternate use of pressure and vacuum The impregnation step is followed by a curing step concerning which we have defined the influence of:

(a) Temperature
(b) Catalysts (positive and negative)
(c) Air (oxygen)

By the use of our process, we are able to render porous articles non-porous and waterproof as well as highly resistant to chemical action.

Although the invention has been described with relation to the impregnating properties of the polymerized nonbenzenoid acetylene polymers, it embraces, within its scope, impregnation with unpolymerized nonbenzenoid acetylene polymers or solutions of the same followed or accompanied by polymerization in situ.

We do not claim novelty in the idea of impregnating porous materials, nor in the general methods of impregnating. We claim to have discovered the application of polymerizable acetylene polymers for this purpose and the suitable methods of treatment, and by such means have prepared impregnated products which, in most of their properties, are vastly superior to any similar products of the prior art.

We claim:

1. A porous object impregnated with a member of the group consisting of nonbenzenoid acetylene polymers and derivatives thereof.

2. A porous object impregnated with a non-benzenoid acetylene polymer.

3. A porous object impregnated with a highly polymerized nonbenzenoid acetylene polymer.

4. A porous object impregnated with a polymerizable halogenated acetylene polymer.

5. A porous object impregnated with a product obtained by reacting sulfur chloride and a polymerizable nonbenzenoid polymer of acetylene.

6. In the process of impregnating porous objects, the step which comprises treating a porous object with a composition comprising essentially a non-benzenoid polymer of acetylene in the fluid state and an antioxidant.

7. A porous object impregnated with a composition comprising essentially a non-benzenoid acetylene polymer and an antioxidant.

8. In the process of impregnating porous objects, the step which comprises treating a porous object with a member of the group consisting of nonbenzenoid acetylene polymers, and derivatives thereof, in the fluid state and under superatmospheric pressure.

9. In the process of impregnating porous objects, the step which comprises treating a porous object with a polymerizable nonbenzenoid polymer of acetylene, in the fluid state, followed by a curing step which comprises the polymerization of said polymerizable material in situ and under superatmospheric pressure.

10. In the process of impregnating porous objects, the step which comprises treating a porous object with a polymerizable nonbenzenoid polymer of acetylene, in the fluid state, followed by a curing step which comprises the polymerization of said polymerizable material in situ and under elevated temperature.

11. In the process of impregnating porous objects, the step which comprises treating a porous object with a polymerizable nonbenzenoid polymer of acetylene, in the fluid state, followed by a curing step which comprises the polymerization of said polymerizable material in situ and in an inert atmosphere.

WILLIAM S. CALCOTT.
ALBERT S. CARTER.
FREDERICK B. DOWNING.